United States Patent [19]

Ernst

[11] Patent Number: 4,700,062

[45] Date of Patent: Oct. 13, 1987

[54] POSITION MEASURING DEVICE WITH A SCANNED ABSOLUTE SCALE

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 759,109

[22] Filed: Jul. 25, 1985

[30] Foreign Application Priority Data

Aug. 11, 1984 [DE] Fed. Rep. of Germany ....... 3429648

[51] Int. Cl.$^4$ .............................................. G01D 5/34
[52] U.S. Cl. .......................... 250/231 SE; 250/237 G; 340/347 P
[58] Field of Search ..................... 250/231 SE, 237 G; 356/395; 340/347 P

[56] References Cited

U.S. PATENT DOCUMENTS

| 3,525,094 | 8/1970 | Leonard | 340/347 P |
| 3,693,024 | 9/1972 | Hulle et al. | 340/347 P |
| 4,266,125 | 5/1981 | Epstein et al. | 250/237 G |
| 4,319,134 | 3/1972 | Weber | 250/231 SE |
| 4,342,996 | 8/1982 | Jannotta | 250/231 SE |
| 4,358,753 | 11/1982 | Cascini | 250/231 SE |
| 4,572,951 | 2/1986 | Toda et al. | 250/231 SE |

Primary Examiner—David C. Nelms
Attorney, Agent, or Firm—Willian Brinks Olds Hofer Gilson & Lione Ltd.

[57] ABSTRACT

A measuring instrument for determining the absolute angular position of two rotatable objects. The instrument comprises a housing which encapsulates a first information carrier with an incremental scale, a second information carrier with a absolute scale, a revolution reduction unit mechanically connecting the second carrier to the first carrier and a scanning element for scanning the first and second information carriers. The angle of rotation is determined within 360° by means of the incremental scale and the number of revolutions of the first information carrier is absolutely determined within the range of i×360° from the absolute scale, wherein i represents the ratio of the revolution reduction unit.

10 Claims, 5 Drawing Figures

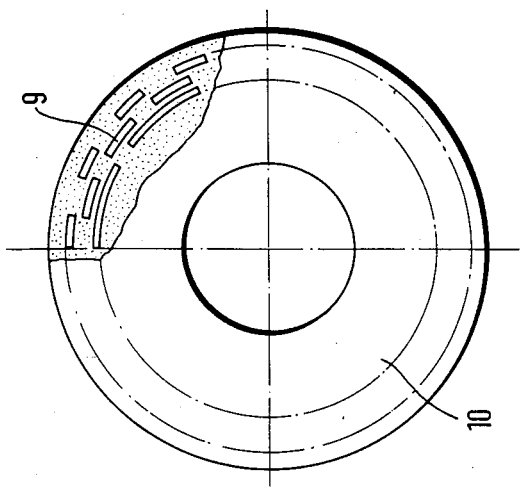
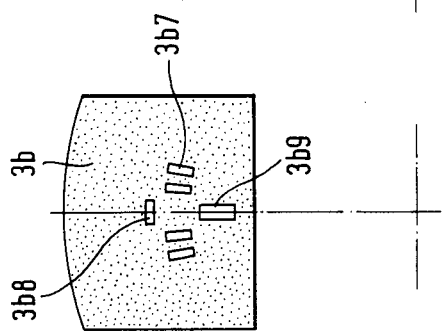
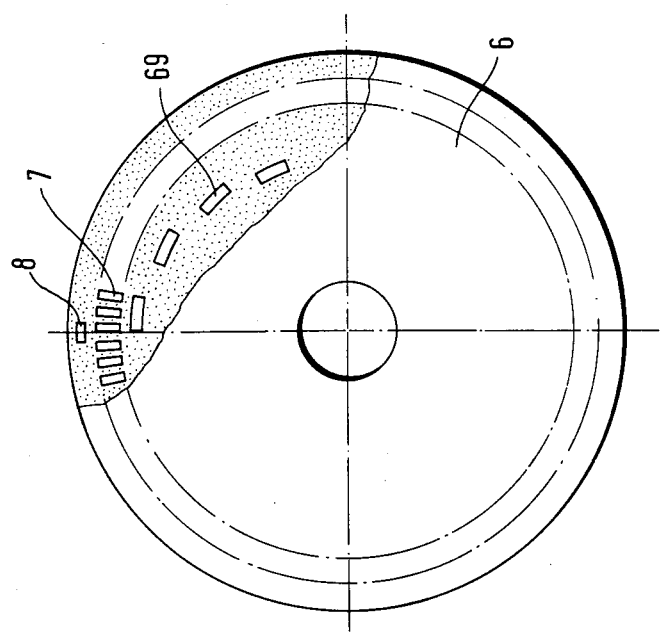

POSITION MEASURING DEVICE WITH A SCANNED ABSOLUTE SCALE

BACKGROUND OF THE INVENTION

The present invention relates to a position measuring instrument for absolutely determining the angular position of two objects by means of a first carrier comprising an incremental scale and at least one reference mark and a second carrier comprising an absolute scale and connected to the first carrier by means of a revolution reduction unit.

Angle measuring instruments may be used to measure the relative angular position of two rotatable objects. Typically an angle measuring instrument comprises a housing which encapsulates a photo element and a coded information carrier which is scanned by the photo element. The coded information carrier is mounted on a shaft rotatable with respect to the photo element and housing. The housing is attached to the first object and the shaft is attached to the second object. Thus, rotation of the first object with respect to the second object produces rotation of the information carrier with respect to the photo element. Such measuring instruments are often used on machine tools to measure the relative angular position of various machine tool components.

It is known to use several coded angular calibration scales connected together by means of gear units in angular measuring instruments. This is discussed in German Patent DD-PS No. 89 729. Also, German DE-OS No. 32 43 956 illustrates this type of position measuring device. Such measuring devices comprise individual scanning units for each measuring scale. The position measuring devices are constructed in a multistage manner to increase the measuring range. Furthermore, incremental angular measuring devices are known in which the calibration scale is applied in the form of a concentric lattice onto one carrier. In these devices the measurement is performed by counting the scanned calibrations. The measuring range is practically unlimited since the calibration scale of incremental angular measuring devices is not finite. However, in the event of a system breakdown, the angular position cannot be determined simply by means of a reference impulse derived once per revolution of the reference marks. If the object to be measured is a spindle-driven machine support and a breakdown occurs, the support must be positioned to a location identified in another manner. This type of positioning is described in KEM Periodical, October 1983, page 109. However, these positioning methods can be complicated and time consuming.

SUMMARY OF THE INVENTION

This invention is directed to an angle measuring device for absolutely determining the angle of rotation by means of an incremental scale and an absolute scale connected to the incremental scale by means of a revolution reduction unit. It is an object of the present invention to avoid the disadvantages of the absolute and the incremental measuring devices described above and to create a measuring device which combines the advantages of both principles.

According to this invention, the absolute angular position of two rotatable objects is determined by means of an incremental scale, a reference mark and an absolute scale. A first carrier comprises the incremental scale and the reference mark. A second carrier comprises the absolute scale. A revolution reduction unit, of reduction ratio i, mechanically connects the first carrier to the second carrier. Apertures, in cooperation with the first carrier, control the scanning of the absolute scale. The absolute number of full revolutions of the first carrier may be read directly from the absolute scale of the second carrier. The fractional revolution of the first carrier is then obtained by scanning the reference mark and the incremental scale. Therefore, the absolute position of an object attached to the first carrier can be determined within the range of $i \times 360°$ by rotating the first carrier less than one revolution.

An advantage of the present invention is that it can be manufactured in a cost effective manner and permits the determination of the absolute angular position within the range of $i \times 360°$, wherein i represents the ratio of the revolution reduction unit used. Within this range, the present invention may be used to determine the absolute angular position with only one motion of less than 360°. A further advantage of the present invention is that only one photo element and only one signal channel is necessary to obtain the code information.

BRIEF DESCRIPTION OF THE DRAWINGS

FIG. 2a is a plan view of an information carrier with incremental scale included in the embodiment of FIG. 1.

FIG. 2b is a plan view of a scanning plate included in the embodiment of FIG. 1.

FIG. 2c is a plan view of an information carrier with an absolute scale included in the embodiment of FIG. 1.

DETAILED DESCRIPTION OF THE PREFERRED EMBODIMENTS

Figure 1:
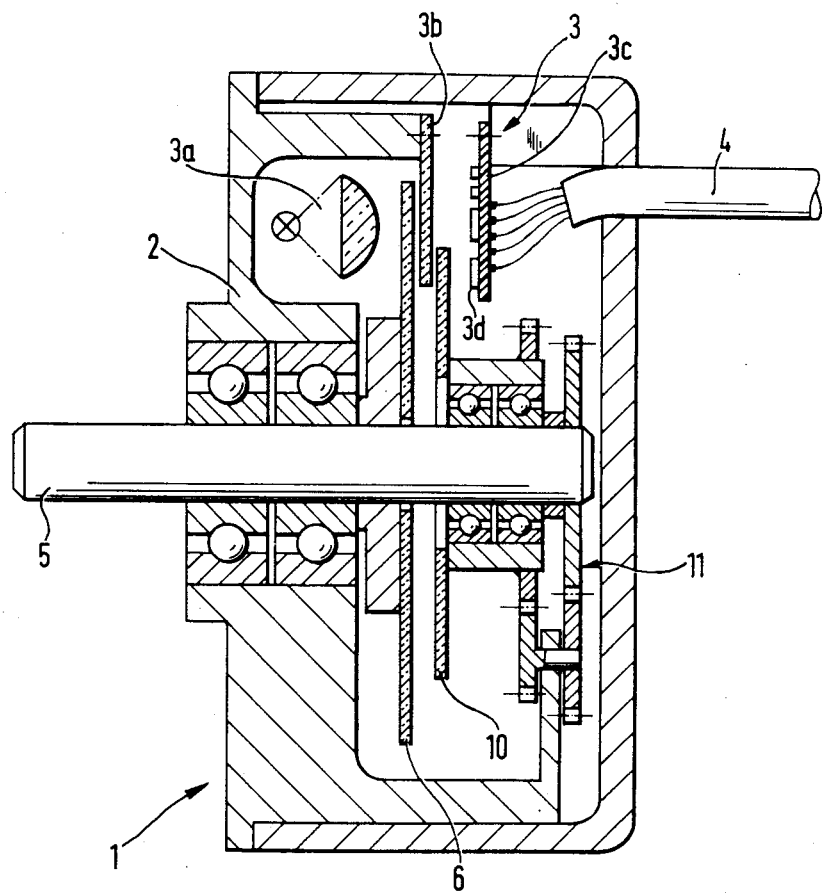
FIG. 1 is a cross-sectional representation of an angular measuring device which incorporates a presently preferred embodiment of this invention.

Turning now to the drawings, FIG. 1 is a cross-sectional representation of an angle measuring instrument 1 with a stator 2 formed as a casing. The stator 2 contains a scanning device 3, which comprises an illumination unit 3a, a scanning device 3b and a photo element array 3c. The photo elements are positioned on the photo element array 3c and comprise electrical connections 4 for communication with a plotting apparatus not shown. A first information carrier 6, attached to a shaft 5 supported by the stator 2, comprises, in a conventional manner, an incremental measuring scale 7. A plan view of the incremental measuring scale 7 is shown in FIG. 2a. The first information carrier 6 also bears reference marks 8 which consist of a group of rectangular regions which are not shown.

When the shaft 5 is rotated, the incremental measuring scale 7 is moved and scanned with the scanning device 3 by the corresponding scanning apertures $3b7$. The incremental scale intervals, which are moved past the scanning plate 3b, are determined, counted and displayed in the plotting apparatus. The zero point of the incremental scale 7 is determined from the reference mark 8. The reference mark 8 is scanned through the corresponding scanning aperture $3b8$ of the scanning plate 3b. The scanning plate 3b has an additional scanning aperture $3b9$, which in cooperation with the apertures 69, scans an absolute scale 9. The apertures 69 are radially displaced and angularly displaced with respect to one another on the information carrier 6. The absolute scale 9 is located on a second information carrier 10 which is rotatably mounted on the shaft 5. The first information carrier 6 and the second information carrier 10 are mechanically connected by means of a revolution reduction unit 11. The axial distance of both of the information carriers 6, 10 should be as small as possible.

During the scanning of the incremental scale 7, the absolute scale 9 and, if necessary, the reference mark 8, the light of the illumination unit 3a passes through the scales 7, 8, 69, 9 and the apertures 3b7, 3b8, 3b9 of the scanning plate 3b and is incident on the photo elements 3d. There the light is converted into corresponding electrical signals which are transformed into measuring values by the plotting apparatus.

An advantage of the angular measuring instrument of FIG. 1–2c is that the angular position of the first information carrier 6 can be absolutely determined within the range of i×360° by means of the absolute scale 9 where i represents the ratio of the revolution reduction unit 11. Since the absolute scale 9 is read in a serial manner during the rotation of the incremental scale 7, the present invention requires only one additional photo element and one additional signal transmission channel. Apertures 69 are provided on the first information carrier 6 which, corresponding to the tracks of the absolute scale 9 of the second information carrier, are radially and angularly displaced to one another. The apertures 69 can be positioned concentrically or even helically on the first information carrier 6.

Whenever the first information carrier 6 has completed a full revolution, the reference mark 8 is scanned and the reading of the absolute scale 9 on the second information carrier 10 is started. Through the use of the revolution reduction unit 11, the second information carrier 10 is continually rotated a fraction of a revolution for each revolution of the first information carrier 6. Thus, by reading the absolute scale 9, the number of revolutions undergone by the first information carrier 6 can be determined absolutely. The control of the reading cycle takes place through the reference marks 8 and the incremental scale 7.

In the event of a breakdown, only the reference mark 8 needs to be scanned in order to obtain the zero point of the incremental position value. The absolute value, determined from the absolute scale, can be read off directly.

The entire measuring range, unlike the case with pure code rotation reproducers, must therefore be applied in the form of absolute scales. For large measuring ranges, many code tracks and many signal channels are required as in so-called "multi-turn reproducers". However, the present embodiment requires significantly less information to be coded since it is only necessary to encode the number of revolutions.

After a system breakdown has occurred, the absolute position can be reproduced with at most one revolution of the first information carrier 6. This is advantageous in machine tools wherein the position measuring of the tool supports is performed with rotation reproducers coupled to the spindle.

Figure 3:
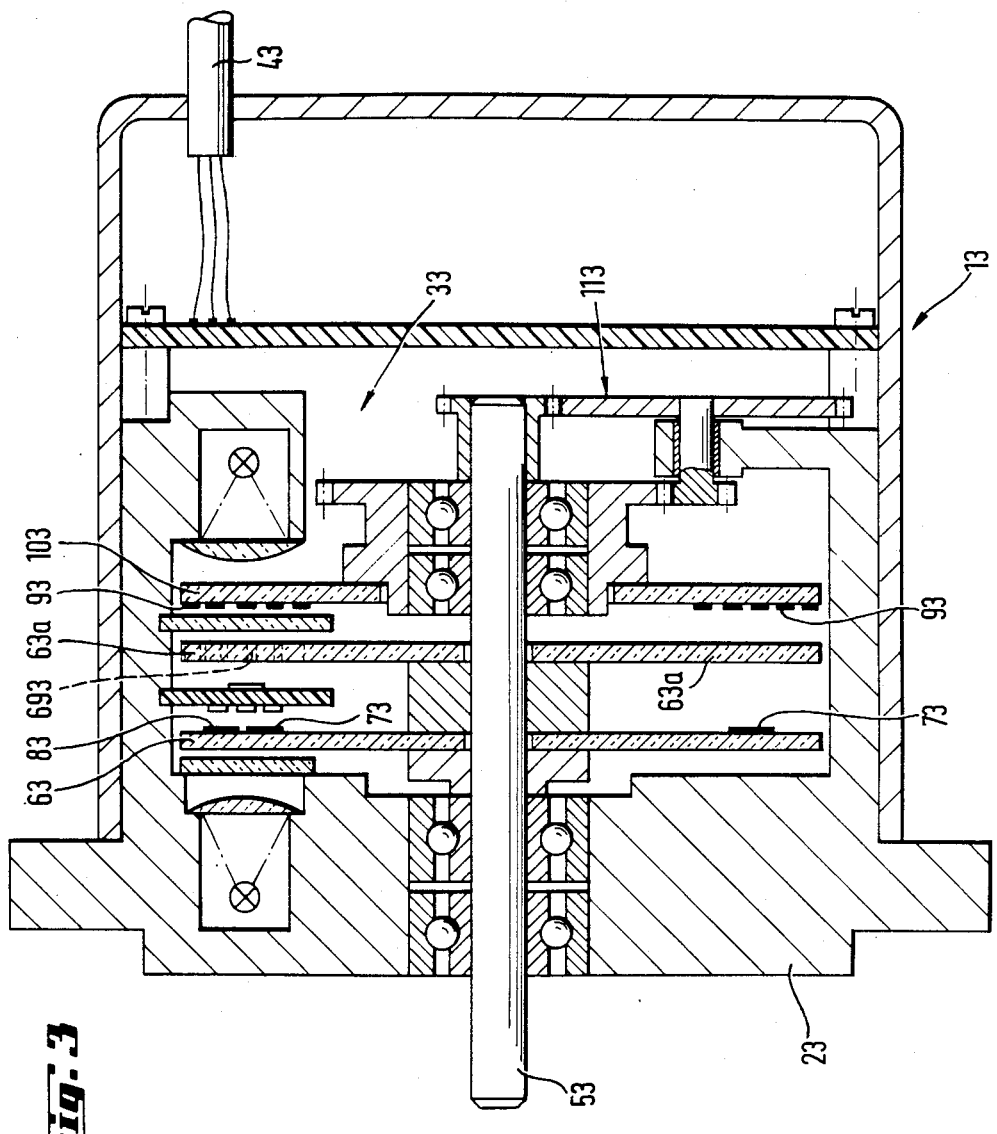
FIG. 3 is a cross-sectional representation of a second preferred embodiment of this invention.

In FIG. 3, a variation of the angular measuring device of FIG. 1 is illustrated. Located on the shaft 53, apart from the first information carrier 63 with the incremental scale 73 and the reference mark 83, is an additional information carrier 63a which bears the apertures 693 for the control of the scanning beams.

In this embodiment, two information carriers 63, 63a have been selected to provide more space for code information. The second information carrier 63a is as large as the first information carrier 63. This second information carrier provides additional coding space which would not otherwise be available on the first information carrier 63 due to the incremental and reference scales 73, 83.

The second information carrier 63a has only the aperture 693 for the control of the scanning beam. The actual coding is located, as in the embodiment of FIG. 1, on an additional information carrier 103 in the form of a absolute scale 93. As shown in the diagram, a second scanning device 33 is used to scan information carrier 63a. The construction of the scanning plate and the photo element array for use with the scanning device 33 is well-known and will not be discussed in detail.

A diagram of the information carrier 63a showing the aperture 693, the scanning plate, and the information carrier 103 with the absolute scale 93 is not shown since this would constitute an almost identical duplication of FIGS. 2a, 2b, and 2c. The difference in size attributable to the absence of the incremental scale and the reference mark on the information carrier 63 would be the only significant information that would derive from such diagrams.

As with the first preferred embodiment, the second preferred embodiment comprises a revolution reduction unit 113 for the reduction of the speed of revolutions between the information carriers 63, 63a and the additional information carrier 103.

The scanning signals produced by the instrument are conveyed to the plotting apparatus, not shown, by means of the connection cable 43. Further discussion of the electrical connections is not necessary since it would not contribute to an understanding of the invention. Additionally, the shaft 53 is supported by a stator 23 in a conventional manner.

The absolute coding of scale 9, 93 enables the device to read from the scale 9, 93 the number of revolutions undergone by the first carrier 6, 63. With this form of coding there are no graduation intervals that need to be counted and stored to indicate the measuring position. Thus, in the event of a power failure, the position, within one revolution of the first carrier 6, 63 is read directly from the scale 9, 93 thereby saving time. The present invention has the time efficient advantage of an absolute scale and the coding simplicity of an incremental scale.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a measuring instrument for measuring the relative position of two objects, rotatable with respect to each other of the type comprising a first information carrier with an incremental graduation scale and at least one reference mark positioned absolutely with respect to the incremental graduation scale, at least a second information carrier with code information in the form of an absolute scale, a revolution reduction unit mechanically connecting the second information carrier to the first information carrier and a scanning device capable of producing a plurality of scanning beams and positioned to scan the first and second information carriers, the improvement comprising:

means for defining a plurality of apertures positioned with respect to the incremental graduation scale and the reference mark of the first information carrier to control the course of the scanning beams to provide serial scanning of the code information of the second information carrier.

2. The invention of claim 1 wherein the first information carrier comprises the apertures for controlling the course of the scanning beams during serial scanning of the code information of the second information carrier.

3. The invention of claim 1 wherein the improvement further comprises an additional information carrier fixedly attached with respect to the first information carrier, the additional information carrier comprising the apertures for controlling the course of the scanning beams for the serial scanning of the code information of the second information carrier.

4. The invention of claim 1 wherein the apertures are radially and angularly displaced with respect to one another.

5. The invention of claim 1 wherein the revolution reduction unit and the absolute scale cooperate such that an individual code value is allocated to the reference mark and capable of being read by the scanning device.

6. The invention of claim 1 wherein the first information carrier comprises a single reference mark which is scanned once per revolution, and wherein the improvement further comprises:

means for generating a unique code value after each complete revolution of the first information carrier, the unique code value corresponding to the number of revolutions of the first information carrier.

7. The invention of claim 1 wherein the scanning of the absolute scale occurs serially between two reference mark scannings.

8. The invention of claim 1 wherein the improvement further comprises:

means for controlling the scanning of the code information by the reference mark and the incremental graduation scale.

9. The invention of claim 1 wherein the scanning of the absolute scale is performed by one photo element and one signal channel.

10. In a measuring instrument for measuring the relative position of two objects, rotatable with respect to each other of the type comprising a first information carrier with an incremental graduation scale and at least one reference mark positioned absolutely with respect to the graduation scale, at least a second information carrier with an absolute scale comprising a plurality of concentric tracks of coded information, a revolution reduction unit mechanically connecting the second information carrier to the first information carrier and a scanning device positioned to scan the first and second information carriers, the improvement comprising:

means for defining a plurality of apertures radially and angularly displaced with respect to one another and positioned with respect to the incremental graduation scale and the reference mark of the first information carrier to control the serial scanning of the absolute scale, each aperture cooperating with the scanning unit to select a portion of an associated track of the absolute scale for scanning by the scanning unit;

the apertures, absolute scale and scanning unit cooperating to generate a unique code value corresponding to the number of revolutions of the first information carrier.

* * * * *